Patented Nov. 27, 1945

2,390,016

UNITED STATES PATENT OFFICE 2,390,016

CHARGE PREPARATION

Irwin D. Wagner, Luther D. Fetterolf, Robert K. Waring, and George T. Mahler, Palmerton, Pa., assignors to The New Jersey Zinc Company, New York, N. Y., a corporation of New Jersey No Drawing. Application March 10, 1944, Serial No. 525,969

6 Claims. (Cl. 75—67)

This invention relates to charge preparation and more particularly to the preparation of a briquetted charge of calcined dolomite and ferrosilicon for use in the production of magnesium. The invention aims to provide an improvement in the briquetting of such a charge, and particularly contemplates an improvement in the wet briquetting of the charge.

In the production of magnesium by the reduction of magnesium oxide (magnesia) in calcined dolomite (or equivalent magnesiferous material) by ferrosilicon (or equivalent reducing agent) it is necessary or highly advantageous to briquet the mix (magnesiferous material and reducing agent). Various difficulties have heretofore been encountered in briquetting the mix, and probably because dry briquetting has been found to present fewer difficulties than wet briquetting, dry briquetting has been widely adopted in the industry. However, in dry briquetting such a mixture there is great wear and tear on the briquetting press, leading to excessive press maintenance, the capacity of the briquetting plant is low, the recirculating load of fines produced by disintegration of briquets is high and the briquet quality generally poor. Apparently good briquets frequently disintegrate when charged into the reducing retorts, and the mass of fines thus formed seriously harms magnesium recovery.

The present invention involves certain improvements in briquetting the mixture of calcined dolomite and ferrosilicon which not only make wet briquetting practical and advantageous but preferable to the present customary practices of dry briquetting. In accordance with the invention, the calcined dolomite (calcine) is slacked with sufficient water to provide water of hydration and also to provide free water to yield with the incorporated ferrosilicon a plastic mix of good briquetting consistency. The ferrosilicon may be initially mixed with the calcined dolomite, but preferably is added to the calcine after the contemplated slaking. In any case, a plastic mix of the calcined dolomite and ferrosilicon is produced in which the calcium oxide (lime) and magnesium oxide in hydratable form present in the initial calcine are hydrated (i. e. converted to calcium hydrate or hydroxide and magnesium hydrate or hydroxide) and in which there is present an excess of free water. This excess of free water may be regarded as the water of plasticity, since it is the water added in excess of that required for hydration in order to impart sufficient plasticity to the mix for briquetting. The plastic mix is preferably densified, as for example, by passage through rolls, such as smooth rolls, corrugated rolls, briquetting rolls, or the like. The densified plastic mix is briquetted or otherwise suitably agglomerated, and the briquets are dried to remove free water and dehydrated by heating or calcining at a temperature sufficiently high to dehydrate the hydrates of calcium and magnesium without objectionably oxidizing the ferrosilicon. The drying and dehydrating may be carried out as separate successive operations or may be combined in a single operation.

In practicing the invention, the calcined dolomite and ferrosilicon are finely ground, either separately or together. In preparing briquets for pyrometallurgical reduction or smelting in metal retorts about 10 inches internal diameter and with about 5 feet of the retort length externally heated to a temperature of 1150–1250° C., the calcined dolomite and ferrosilicon may advantageously be ground so that 80–90% passes a 200 mesh screen.

The contemplated slacking of the calcined dolomite can be carried out in a single operation, or just sufficient water may be added to the calcine to slack the calcium oxide and hydratable magnesium oxide, and in a subsequent step the excess water required to yield a plastic mix may be added to the slacked calcine. Care should be taken to bring about a relatively complete hydration of the mix. By relatively complete hydration is meant the hydration of all the oxides of calcium and magnesium present that may become hydrated at any subsequent stage in the treatment or storage of the mix or green briquets made therefrom. Thus, in the case of a product in which the magnesia has been dead burned or is inactive with respect to water, only the calcium oxide need be completely hydrated. On the other hand, where the magnesia is capable of taking up water of hydration under the prevailing conditions, care must be taken to hydrate the magnesia also. If this precaution be not taken, hydration will occur in the briquets after briquetting and the resulting expansion will disintegrate the briquets. The amount of water required for hydration thus depends upon the composition and nature of the calcine. The hydration of the calcium oxide in a typical calcined dolomite (e. g. Permanente stone) requires about 16% water, and the hydration of all of the magnesia would require about 8% additional water, these percentages being based on the weight of the dried hydrated briquets.

The amount of free water (i. e. excess over and above that necessary for slacking) depends to some extent upon the calcine itself, and may vary from 8 to 15%, but ordinarily will be in the neighborhood of 12% based on the weight of the plastic mix of proper briquetting consistency. These percentage figures are obtained by dividing the weight of the water lost in drying the wet briquets (at a temperature of 100–110° C.) by the initial weight of the wet briquets. The weight of the water lost in dehydrating the thus dried briquets (at a temperature of 650–750° C.) divided by the initial weight of the dried briquets gives the percentage of water of hydration, and is a measure of the amount of hydration.

The water required for hydration and moistening of the mix may be easily incorporated in the mix in a chaser (pan mill with a very heavy muller), paddle mixer or conventional cement mixer. The ferrosilicon is preferably added to the hydrated plastic mix, although it may be added before or during the hydration and moistening of the calcined dolomite. The relative proportions of calcined dolomite and ferrosilicon are preferably such that the briquets contain stoichiometric equivalents of silicon (as ferrosilicon) and magnesia, namely 28 parts by weight of silicon per 80 parts by weight of magnesia.

After the mixture of calcined dolomite and ferrosilicon has been hydrated and moistened, it is preferably subjected to preliminary densification. This densification may be brought about by a passage between smooth rolls under pressure adequate to flake the material, or by passage through briquetting rolls with small pockets yielding small briquets, or in any other suitable manner. The flakes or small briquets can then be readily formed into briquets of any appropriate shape or size by passage through a roll press. For pyrometallurgical reduction as hereinbefore described, the briquets may advantageously be "pillow block" shaped, about 2 inches by 2 inches by 1¼ inch. With the moistened and predensified mix, ordinary briquetting machines yield a high output of green briquets with sufficient strength to stand subsequent handling without disintegration. Very satisfactory results have been obtained by passing the densified plastic mix through briquet rolls exerting a pressure of about 2000 pounds per square inch on the mix.

The green briquets are next dried to remove free water, and then heated or calcined to remove the water of hydration. The drying may be accomplished at a temperature of about 110° C. in any suitable type of drier, and the subsequent heating may be carried out in any suitable apparatus adapted to impart a temperature of from 650 to 750° C. to the briquets. We have obtained satisfactory results by heating the briquets by direct contact with hot heating gases, such as the hot products of combustion of solid, liquid or gaseous fuel, as for example, in an internally fired rotary kiln.

The briquet temperature must not be allowed to become too high during the heating (dehydrating) step, since ferrosilicon will be oxidized with increasing rapidity as the temperature is increased above about 700° C. It is therefore our preferred practice to heat the briquets to 650° or 700° C. With some types of externally heated furnaces, it is permissible to use a considerably higher heating gas temperature if care is taken to avoid having any of the briquets reach a temperature much above 700° C. It is, however, advantageous to carry out the heating by direct contact with the hot heating gases. The briquets may be subjected to direct heating on a grate or in a rotary kiln or other conventional heating apparatus. By appropriately controlling the temperature of the hot heating gases so that the temperature imparted to the briquets is between 650 and 700° C. objectionable oxidation of the ferrosilicon is avoided and little or no carbonation of the calcium oxide takes place. The heating should be continued until the briquets are thoroughly dehydrated.

It is desirable to charge the briquets while still hot into the reducing retort. Thus, the heating (dehydrating) step may, in effect, be regarded as a preheating of the briquets for the following reduction or smelting operation. This expedient is desirable not only to save heat, but also to prevent disintegration of the briquets by hydration and carbonation on exposure to the atmosphere when cool. Such hydration or carbonation may result in crumbling of the briquets.

The density of briquets prepared in accordance with the invention may, and usually will, be less than the density of briquets prepared by dry processes. This decrease in density is due to the expulsion of water of hydration during the heating step. Some dolomites yield on calcination a calcine in which only the calcium oxide hydrates. With such dolomites, we have found in practice that the finished (preheated) briquets produced in accordance with the invention have a density of about 1.7 grams per cc. We have, on the other hand, encountered dolomites in which part or all of the magnesium oxide hydrates. The complete hydration of the magnesium oxide results in a decrease in the density of the finished (preheated) briquet from about 1.7 to about 1.3 grams per cc.

It will be understood that the hydrated plastic mix may be formed into agglomerates by methods other than ordinary briquetting. Thus, cylindrical shapes may be produced by extrusion in any conventional extruding apparatus; likewise, tubular shapes may be produced on a machine resembling a macaroni machine or the like. For convenience such methods of agglomerating are herein included under briquetting. Similarly, calcined dolomite and ferrosilicon are herein intended to embrace equivalent magnesiferous material and reducing agent, respectively, suitable for inclusion in a briquetted charge mixture for use in the production of magnesium by pyrometallurgical reduction or smelting.

As hereinbefore stated the density of briquets prepared according to the wet process of the present invention is usually less than the density of briquets produced by dry processes. Briquets of increased density may be obtained by calcining the dolomite in the presence of calcium chloride or sodium chloride, as described in the copending patent application of Robert K. Waring, Ser. No. 525,970, filed March 10, 1944.

We claim:

1. The improvement in briquetting a mixture of calcined dolomite and ferrosilicon for use in the production of magnesium, which comprises slacking the calcined dolomite with sufficient water to hydrate all of the hydratable oxides of calcium and magnesium in the calcined dolomite and to yield with the ferrosilicon a plastic mix of good briquetting consistency, briquetting the plastic mix, and heating the briquets to a temperature sufficiently high to remove the free water and to dehydrate the hydrates of calcium and magnesium but insufficient to objectionably oxidize the ferrosilicon.

2. The improvement in accordance with claim 1, in which the briquets are heated by direct contact with hot heating gases to a temperature of from 650 to 750° C.

3. The improvement in briquetting a mixture of calcined dolomite and ferrosilicon for use in the production of magnesium, which comprises slacking the calcined dolomite with sufficient water to hydrate all of the hydratable oxides of calcium and magnesium in the calcined dolomite and to yield with the ferrosilicon a plastic mix of good briquetting consistency, densifying the plastic mix, briquetting the densified plastic mix, and heating the briquets to a temperature sufficiently high to remove the free water and to dehydrate the hydrates of calcium and magnesium but insufficient to objectionably oxidize the ferrosilicon.

4. The improvement in accordance with claim 3, in which the briquets are heated by direct contact with hot heating gases to a temperature of from 650 to 750° C.

5. The improvement in briquetting a mixture of calcined dolomite and ferrosilicon for use in the production of magnesium, which comprises slacking the calcined dolomite with water in amount exceeding that required to hydrate all of the hydratable oxides of calcium and magnesium and producing with the ferrosilicon a plastic mix, densifying the plastic mix, briquetting the densified plastic mix, removing the free water from the briquets, and dehydrating the hydrates of calcium and magnesium by heating the briquets to a temperature of from 650 to 750° C.

6. The improvement in briquetting a mixture of calcined dolomite and ferrosilicon for use in the production of magnesium, which comprises slacking the calcined dolomite with water in amount exceeding that required to hydrate all of the hydratable oxides of calcium and magnesium in the calcined dolomite and to yield with the incorporated ferrosilicon a plastic mix of good briquetting consistency, densifying the plastic mix by passage through rolls, briquetting the densified plastic mix by passage through briquet rolls exerting a pressure of about 2000 pounds per square inch, removing the free water from the briquets by drying, and dehydrating the hydrates of calcium and magnesium by heating the briquets to a temperature of from 650 to 750° C.

IRWIN D. WAGNER.
LUTHER D. FETTEROLF.
ROBERT K. WARING.
GEORGE T. MAHLER.